(12) United States Patent
Matsumoto et al.

(10) Patent No.: US 7,097,190 B2
(45) Date of Patent: Aug. 29, 2006

(54) BICYCLE WITH SWING ARM AND TRANSMISSION

(75) Inventors: Shinya Matsumoto, Wako (JP); Kenji Morita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/695,891

(22) Filed: Oct. 28, 2003

(65) Prior Publication Data

US 2004/0130120 A1 Jul. 8, 2004

(30) Foreign Application Priority Data

Nov. 5, 2002 (JP) ............... 2002-321834

(51) Int. Cl.
*B62K 25/00* (2006.01)
(52) U.S. Cl. .................... 280/281.1; 280/283
(58) Field of Classification Search ........ 280/259–261, 280/281.1, 283–286
See application file for complete search history.

(56) References Cited

U.S. PATENT DOCUMENTS

| | | | | |
|---|---|---|---|---|
| 5,346,234 A | * | 9/1994 | Kadaja | 280/216 |
| 5,452,910 A | * | 9/1995 | Harris | 280/284 |
| 5,899,480 A | * | 5/1999 | Leitner | 280/284 |
| 5,976,052 A | * | 11/1999 | Lenoble | 475/297 |
| 5,979,924 A | * | 11/1999 | D'Aluisio et al. | 280/261 |
| 6,029,990 A | * | 2/2000 | Busby | 280/261 |
| 6,102,421 A | * | 8/2000 | Lawwill et al. | 280/284 |
| 6,131,934 A | * | 10/2000 | Sinclair | 280/284 |
| 6,450,520 B1 | * | 9/2002 | Girard | 280/284 |
| 6,595,538 B1 | * | 7/2003 | Ellsworth et al. | 280/284 |

FOREIGN PATENT DOCUMENTS

JP 2002-227756 8/2002

* cited by examiner

*Primary Examiner*—Lesley D. Morris
*Assistant Examiner*—Lee Lum
(74) *Attorney, Agent, or Firm*—Hamre, Schumann, Mueller & Larson, P.C.

(57) ABSTRACT

A bicycle is provided with a body frame, a swing arm structure, a rear wheel, and a transmission. The transmission includes a drive rotation body to be rotation-driven by a crankshaft, and a plurality of gear-change rotation bodies. The transmission is provided with an output axis supported to be rotatable to a support member fixed to the bicycle body frame, and drive-coupled to the plurality of gear-change rotation bodies, and a gear-change pulley for drive-coupling the drive rotation body and the operation rotation body alternatively selected from the plurality of gear-change rotation bodies by being placed thereacross by a gear shifting mechanism. The output axis is drive-coupled to the rear wheel via an output pulley, thereby preventing the gear-change pulley from sagging even if the swing arm swings.

15 Claims, 5 Drawing Sheets

BICYCLE WITH SWING ARM AND TRANSMISSION

FIELD OF THE INVENTION

The present invention relates to a bicycle including a bicycle body frame provided with a pivot section for supporting a swing arm to freely swing, and a transmission.

BACKGROUND OF THE INVENTION

JP-A-2002-225776 discloses a bicycle including a swing arm pivotally supporting a rear wheel and a transmission. This bicycle is provided with a rear frame (equivalent to a swing arm) supported to a main frame to freely swing, a shock absorber provided between the main frame and the rear frame, a pair of front sprockets provided coaxial to a crank having attached with pedals, a plurality of rear sprockets coupled to a rear hub, and a driving chain placed across the front sprockets and the rear sprockets. Gear changing is done by front and rear derailleurs moving the driving chain.

One issue with this design is that if the swing center line of the rear frame is away from the rotation center line of the front sprocket, the distance between the center lines significantly changes when the rear frame swings, i.e., between the rotation center line of the front sprocket and the rotation center line of the rear sprocket. This causes the driving chain to sag a lot. If the driving chain sags due to the swinging rear frame at the time of gear change through operation of the derailleurs, it is difficult to change gears swiftly and reliably.

Alternatively, the rear frame is supported in the vicinity of the crank in such a manner that the swing center line of the rear frame is located in the vicinity of the rotation center line of the front sprocket. Such a structure prevents the driving chain from sagging a lot even if the rear frame swings, and can lead to swift and reliable gear change to any desired gear position even while the rear frame is swinging.

However, the problem with the above conventional technology is that, for the purpose of ensuring swift and reliable gear change by reducing the sag occurring to the driving chain due to the swinging rear frame through operation of the derailleurs, there is a need to place the swing center line of the rear frame in the vicinity of the crank. This reduces the flexibility of position placement for the rear frame to be pivotally supported to the bicycle body frame. As such, depending on where the pivotally-supporting position will be, the rear frame and the bicycle body frame will be limited in design options.

SUMMARY OF THE INVENTION

In an embodiment, the present invention is directed to increasing the flexibility of position placement of a pivot section in a bicycle body frame while ensuring swiftness and reliability of gear changing even with the swing arm supported to the pivot section to freely swing. In another embodiment of the invention, the pivot section and a transmission are arranged on the bicycle body frame in a compact manner without increasing the transmission in size.

In an embodiment, the invention is directed to a bicycle, comprising: a bicycle body frame provided with a pivot section for supporting, to freely swing, a swing arm pivotally supporting a rear wheel; and a transmission including: a drive rotation body to be rotation-driven by a crankshaft; and a plurality of gear-change rotation bodies, and in the transmission, the drive rotation body is drive-coupled by an operation rotation body alternatively selected from the plurality of gear-change rotation bodies by a gear shifting mechanism, in which the transmission includes: an output axis supported to be rotatable to a support member fixed to the bicycle body frame, and drive-coupled to the plurality of gear-change rotation bodies; and a gear-change pulley for drive-coupling the drive rotation body and the operation rotation body by being placed thereacross by the gear shifting mechanism, and the output axis is drive-coupled to the rear wheel via an output pulley.

With such a structure, the drive rotation body is drive-coupled with the operation rotation body alternatively selected from the plurality of gear-change rotation bodies by a gear shifting mechanism using a gear-change pulley different from such an output pulley as a driving chain used in the above-described conventional technology. Further, the output axis to which the plurality of gear-change rotation bodies are drive-coupled is fixed to the bicycle body frame. Therefore, no sag occurs to the gear-change pulley even if the swing arm swings. Also, to drive-couple the drive rotation body to the gear-change rotation bodies drive-coupled to the output axis drive-coupled to the output pulley, is a flexible gear-change pulley. Accordingly, the output axis can be easily changed in position in the transmission even if there needs to catch up with the placement change occurred to the bicycle body frame or the pivot section. What is better, the placement flexibility is also increased. In order to suppress any distance change between the rotation center line of the output axis and the rotation center line of the rear wheel when the swing arm swings, there only needs to place the pivot section in the vicinity of the output axis having better placement flexibility. Unlike the above conventional technology, this resultantly increases the placement flexibility of the pivot section required for suppressing the distance change between the center lines. What is better, the pulley can be rather light in weight.

According to an embodiment of the invention, the pivot section is located inside of the gear-change pulley.

With such a structure, utilizing a space formed inside of the gear-change pulley, the pivot section can be fit in the area enclosed by the transmission when viewed from the side. This structure also allows the pivot section to be placed across the space.

DETAILED DESCRIPTION OF THE INVENTION

In an embodiment, a transmission includes a drive rotation body to be rotation-driven by a crankshaft, and a plurality of gear-change rotation bodies. The transmission is provided with an output axis supported to be rotatable to a support member fixed to the bicycle body frame, and drive-coupled to the plurality of gear-change rotation bodies, and a gear-change pulley for drive-coupling the drive rotation body and the operation rotation body alternatively selected from the plurality of gear-change rotation bodies by being placed thereacross by a gear shifting mechanism. The output axis is drive-coupled to the rear wheel via an output pulley, thereby preventing the gear-change pulley from sagging even if the swing arm swings. This also can lead to swift and reliable gear change to any desired gear position by the gear shifting mechanism, ensuring gear change with swiftness and reliability. Further, for drive-coupling the operation rotation body and the drive rotation body, a flexible gear-change pulley can be used. This eases the placement change of the output axis in the transmission, and leads to better placement flexibility. In order to suppress any distance change between the rotation center line of the output axis and the rotation center line of the rear wheel when the swing arm swings, there only needs to place the pivot section in the vicinity of the output axis having better placement flexibility. This resultantly increases the placement flexibility of the pivot section, leading to better design flexibility of the swing arm and the bicycle body frame. Moreover, the pulley is rather light in weight, making the transmission light in weight.

In an embodiment, the pivot section is located inside of the gear-change pulley. This allows the placement of the pivot section utilizing the space formed inside of the gear-change pulley, favorably leading to compact placement of the pivot section and the transmission to the bicycle body frame without increasing the transmission in size.

In the below, an embodiment of the present invention is described by referring to FIGS. 1 to 5.

Figure 1:
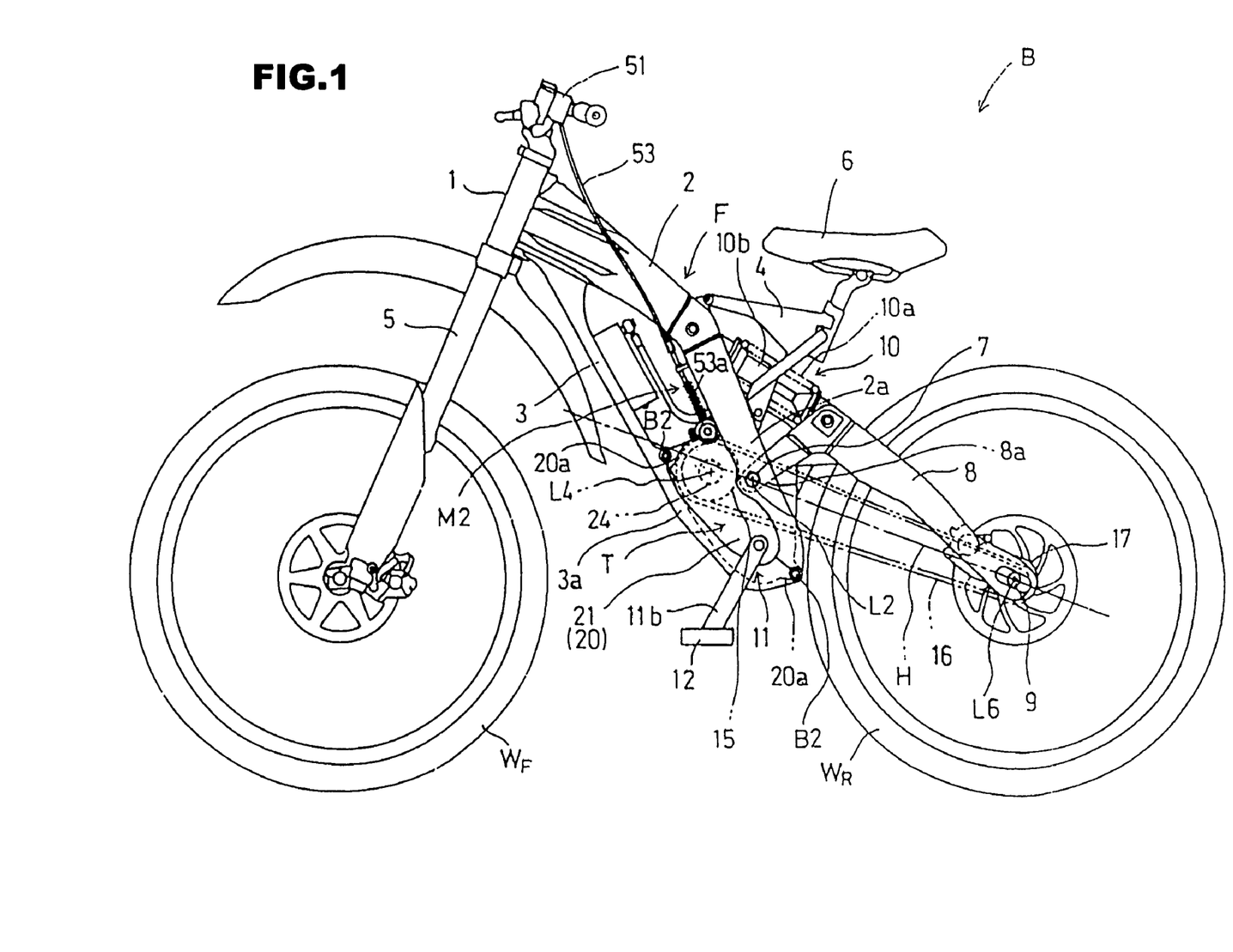
FIG. 1 is a left side schematic view of a bicycle in accordance with an embodiment of the invention.
Figure 2:
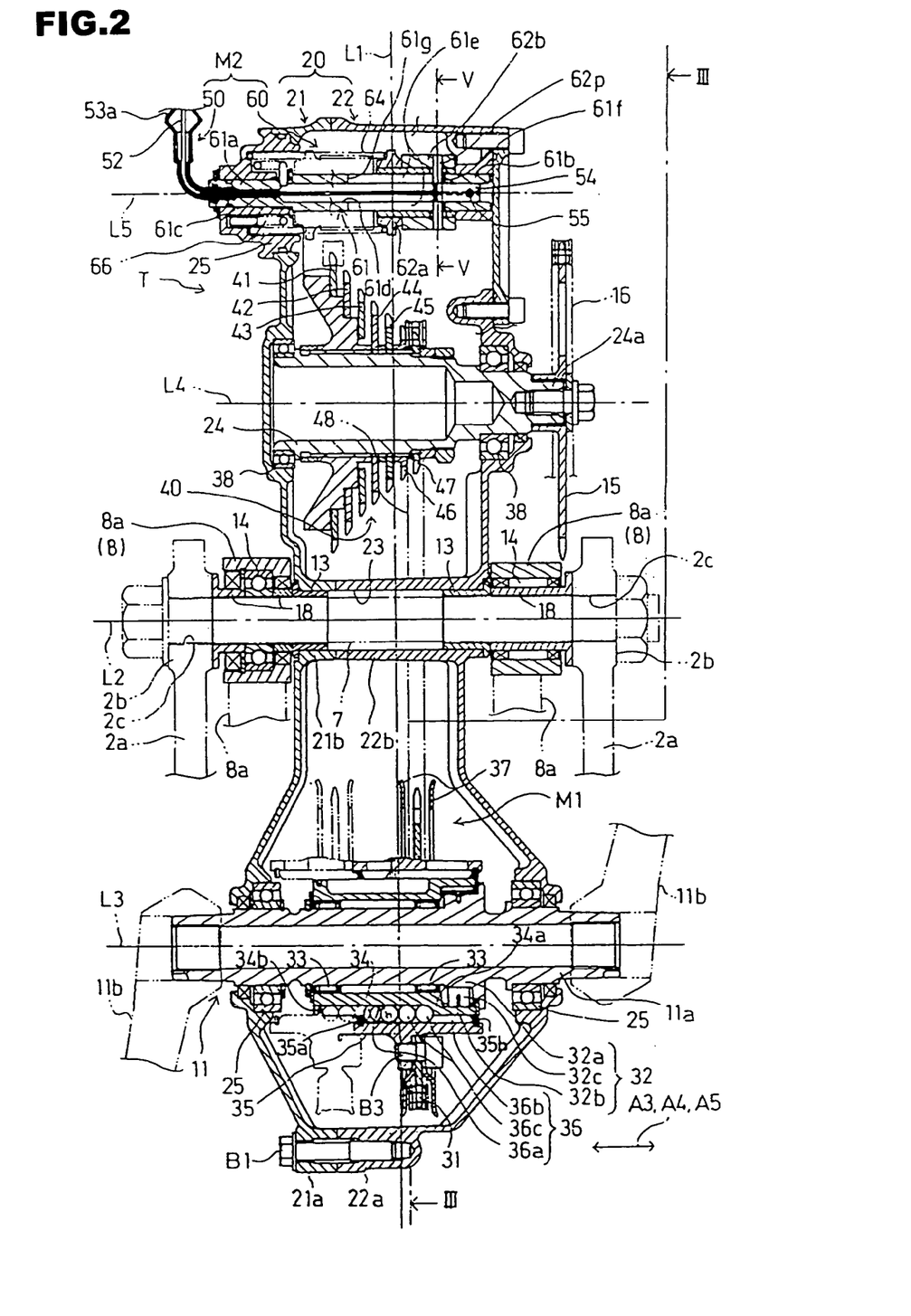
FIG. 2 is a sectional view of a transmission incorporated into the bicycle of FIG. 1 taken along line II—II of FIG. 3.

Referring to FIGS. 1 and 2, a bicycle B to which the present invention is applied is one specifically designed for going downhill, and used for time competing games such as going down an unpaved logging course provided with high-speed corners and jumping sections on the drag road.

A bicycle body frame F of the bicycle B is provided with a head pipe 1 for supporting, for steering, a pair of horizontally-arranged front forks 5, the lower ends of which each axially support a front wheel $W_F$. Also included are: a pair of horizontally-arranged main frames 2 both extending obliquely downward towards the rear from the head pipe 1; a down tube 3 locating below the main frames 2 and from the front end parts thereof, extending obliquely downward towards the rear; and a saddle frame 4 extending from the center parts of the main frames 2 to support a saddle 6.

It should be noted here that, in this specification, expressions of "up and down", "front and rear", and "right and left" are those with reference to the bicycle, and corresponding to "up and down", "front and rear", and "right and left" of the bicycle. Further, viewing from the side means viewing from the right and left sides.

To a pivot axis 7 being a pivot section provided to rear parts 2a of the main frames 2, supported to freely swing are front end parts 8a of a pair of horizontally-arranged swing arms 8 for pivotally supporting a rear wheel $W_R$ via an axle 9 attached to the rear end part thereof. The swing arms 8 are coupled to the main frames 2 via a suspension 10 including a compression spring 10a and a damper 10b, and thus can swing about the pivot axis 7 in the vertical direction together with the rear wheel $W_R$.

The bicycle B is provided with a crankshaft 11 and a power transmission unit including a transmission T and a driving force transmission mechanism. As shown in FIG. 1, the transmission T is placed in the lower part of the bicycle body frame F, between the rear parts 2a of the main frames 2 and a rear part 3a of the down tube 3 locating in the forward part of the rear parts 2a, and fixed to a main axis 11a of the crankshaft 11 and the rear ends 2a and 3a. Viewing the bicycle down from the above, i.e., with a plan view, the driving-force transmission mechanism is arranged on the right side, which is one side with respect to a bicycle body center line L1 (see FIG. 2) being the center line of the bicycle body in the width direction (corresponding to the right and left directions) of the bicycle B, and the transmission T.

Figure 3:
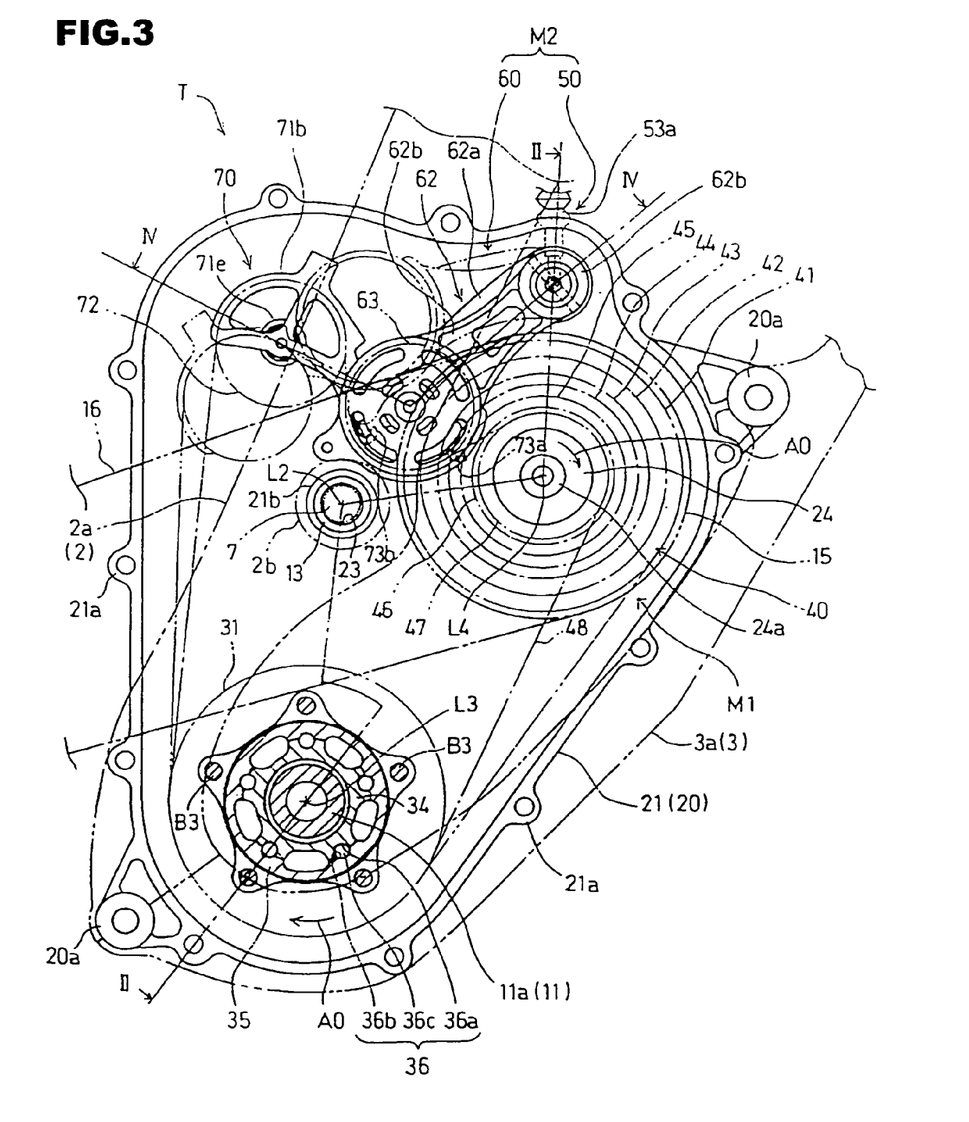
FIG. 3 is a sectional view of the transmission incorporated into the bicycle of FIG. 1 without a second case part, taken along line III—III of FIG. 2.

Referring also to FIG. 3, the transmission T includes a metal case 20 structured by a pair of horizontally-arranged first and second case parts 21 and 22 coupled to each other by a bolt B1 through a plurality of bolt attachment sections 21a and 22a formed in the outer edge section. The case 20 is fixed to the main frames 2 and the down tube 3 in a pair of attachment sections 20a formed in the outer edge section using a bolt B2 being fixation means.

The crankshaft 11 is provided with the main axis 11a so placed as to go through the lower part of the case 20 in the lateral direction, and a pair of crank arms 11b respectively coupled to the right and left end parts of the main axis 11a protruding outwardly from the case 20. To the crank arms 11b, a pedal 12 (see FIG. 1) is each attached to freely rotate.

Overhead of the main axis 11a of the crankshaft 11, and above the case 20, the output axis 24, the pivot axis 7, and a derailleur axis 61 of the transmission T are so placed as to extend in the lateral direction, i.e., their rotation center line L4, and center axis lines L2 and L5 are parallel to one another, and these lines L4, L2, and L5 are parallel to a rotation center line L3 of the crankshaft 11. The crankshaft 11, the output axis 24, the derailleur axis 61, and the pivot axis 7 are so placed as to overlay one another in the lateral direction, and intersect with the bicycle body center line L1 with the plan view.

The pivot axis 7 is fixed to the rear parts 2a of the main frames 2 by going through the inside of a pair of cylindrical bushings 13 retained by both a through hole 2c formed to pivot bosses 2b at the rear parts 2a of the main frames 2, and a through hole 23 formed by tube sections 21b and 22b of the first and second case parts 21 and 22. The swing arms 8 are both supported by the pivot axis 7 to freely swing by, at the right and left sides of the case 20, the front end parts 8a laterally between the case 20 and the rear ends 2a of the main frames 2 being supported by the pivot axis 7 protruding outside of the case 20 via a collar 18 and a bearing 14.

Referring to FIG. 1, the output axis 24 and the pivot axis 7 are so arranged as to fit within the rotation path of the crank arm 11b. Also, the output axis 24 and the pivot axis 7 are placed with respect to the bicycle body frame F in such a manner that the rotation center line L4 of the output axis 24 locates in a virtual swing range on a virtual plane H including the swing center line L2 of the swing arms 8 (corresponding to the center axis line L2 of the pivot axis 7), and a rotation center line L6 of the rear wheel $W_R$ (corresponding to the center axis line of the axle 9). That is, corresponding to the swing range of the swing arms 8, the virtual plane H swings about the swing center line L2 within the virtual swing range, while the rotation center line L4 of the output axis 24 is located in this virtual swing range.

Referring to FIGS. 2 and 3, the output axis 24 accommodated in the case 20 includes a right end part 24a being one end part protruding outwardly from the second case part 22. To this right end part 24a, a driving sprocket 15 as an output drive rotation body is coupled. Referring also to FIG. 1, between the driving sprocket 15 and a driven sprocket 17 as an output driven rotation body drive-coupled to the rear wheel $W_R$, a chain 16 is placed across as a flexible output pulley. Herein, the driving sprocket 15, the chain 16, and the driven sprocket 17 structure the driving force transmission mechanism driving the rear wheel $W_R$ as a driving wheel.

In the below, a further detailed description will be given mainly about the crankshaft 11, the transmission T, and a gear shifting mechanism M2.

Referring to FIGS. 2 and 3, the transmission T includes the case 20 and a gear change mechanism M1 placed inside the case 20. The crankshaft 11 is partially accommodated in the case 20 for retention therein, and the gear shifting mechanism M2 attached to the case 20 for gear change of the gear change mechanism M1 to any desired gear position is coupled to the gear change mechanism M1 for operation. The gear change mechanism M1 is provided with a sliding mechanism, which will be described later, a driving sprocket 31, a plurality of gear-change sprockets 41 to 47, a chain, and the output axis 24.

The crankshaft 11 is supported by the case 20 to freely rotate via the pair of horizontally-arranged bearings 25. The bearings 25 are provided towards the end parts of the main axis 11a, respectively, and retained in the case 20 by the case parts 21 and 22 of the case 20. The main axis 11a is provided with the driving sprocket 31 as the drive rotation body between the bearings 25 coaxially to the main axis 11a. The driving sprocket 31 is drive-coupled to the main axis 11a via a one-direction clutch 32 being a component of the power transmission unit. The one-direction clutch 32 including a clutch inner 32a as a part of the main axis 11a with a clutch element 32c sandwiched, and a clutch outer 32b as a part of an inner tube 34, which will be described later, transfers only the rotation of the crankshaft 11 in the forward direction A0 to the drive sprocket 31 (the heading direction of the bicycle B). In the below, the forward direction of various axes and sprockets when the crankshaft 11 rotates in the forward direction A0 is denoted by a reference character A0.

Between the one-direction clutch 32 and the driving sprocket 31, is the sliding mechanism allowing the driving sprocket 31 to move in a direction A3 of the rotation center line L3 with respect to the main axis 11a, and rotating together with the clutch outer 32b of the one-direction clutch 32. The sliding mechanism includes: the inner tube 34 as a part of the clutch outer 32b and to the outer radius of the main axis 11a, coaxially supported to the main axis 11a to freely rotate via a pair of bearings 33; an outer tube 35 provided coaxially to the inner tube 34 in the radial direction of the inner tube 34; and an engagement mechanism 36 provided between the outer radius of the inner tube 34 and the inner radius of the outer tube 35. The outer tube 35 is coupled with the driving sprocket 31 and a chain guide 37 by a bolt B3 to be a piece, and the driving sprocket 31, the chain guide 37, and the outer tube 35 rotate together as a piece, and move together in the direction A3 of the rotation center line along the main axis 11a.

The engagement mechanism 36 for allowing the inner tube 34 and the outer tube 35 to rotate together, and allowing the driving sprocket 31 to move towards the direction A3 of the rotation center line with respect to the inner tube 34 and the main axis 11a is structured by a pair of holding grooves 36a and 36b each formed to face each other in the radial direction at the equal angle positions in the peripheral direction of the outer radius of the inner tube 34 and the inner radius of the outer tube 35, and a ball string composed of a plurality of balls 36c accommodated across in the holding grooves 36a and 36b to engage with the inner tube 34 and the outer tube 35 in the peripheral direction as an engagement element. The pair of the holding grooves 36a and 36b is plurally provided, and in this embodiment has five pairs. The width of each of the holding grooves 36a and 36b in the direction A3 of the rotation center line is so set as to be wider than the width of the ball string in the direction A3 of the rotation center line, and to allow the driving sprocket 31 to move in the direction A3 of the rotation center line in the movement range equal to the shifting movement range of a derailleur 60, which will be described later. For the purpose of defining the movement range of the driving sprocket 31 and the outer tube 35, the inner tube 34 and the outer tube 35 are provided, respectively, with first stoppers 34a and 35a and second stoppers 34b and 35b for defining the movement of the ball string.

The output axis 24 is rotatably supported to the case 20 via a pair of horizontally-arranged right and left bearings 38 retained in the case 20 to the case parts 21 and 22, respectively. In this sense, the case 20 is the supporting member fixed to the bicycle body frame F to support the crankshaft 11 and the output axis 24 to freely rotate.

To the output axis 24, a rotation body group composed of a plurality of gear-change rotation bodies is drive-coupled at the position intersecting with the bicycle body center line L1 with a plan view in such a manner as to rotate together with the output axis 24 between the bearings 38. In this embodiment, the rotation body group is a sprocket group 40 composed of the gear-change sprockets 41 to 47 as the seven different gear-change rotation bodies varying in diameter. These seven gear-change sprockets 41 to 47 are arranged in order, from the gear-change sprocket 41 for the first gear being the slowest speed to the gear-change sprocket 47 for the seventh gear being the fastest speed, i.e., from slow to fast, along the direction A4 of the rotation center line L4. Those are spline-coupled coaxially to the output axis 24 at the outer radius thereof.

Between the driving sprocket 31 and an operation sprocket (gear-change sprocket 47 in FIG. 2) being one of the gear-change sprockets selected out of the sprocket group 40 by the gear shifting mechanism M2, a chain 48 as a flexible gear-change pulley is placed across. With such a structure, the output axis 24 is rotation-driven by the crankshaft 11 with a gear-change rate determined by the driving sprocket 31 and the operation sprocket drive-coupled via the chain 48. The power of the output axis 24 is transmitted to the rear wheel $W_R$ via the driving sprocket 15, the driven sprocket 17 (see FIG. 1), and the chain 16 wound around these sprockets 15 and 17.

The gear shifting mechanism M2 is provided with a gear-change operation mechanism 50, the derailleur 60 including a guide pulley 63, and a tensioner 70 including a tension pulley 72. The chain 48 is wound around the driving sprocket 31, the operation sprocket, and the guide pulley 63 and the tension pulley 72 placed on the side towards which the chain 48 sags.

Referring also to FIG. 1, the gear-change operation mechanism 50 is provided with a gear-change operation member 51 exemplarily structured by a gear-change lever operated by a driver, a wire 52 for operation-coupling the gear-change operation member 51 and the derailleur 60 for transmitting the operation of the gear-change operation member 51 to the derailleur 60, and an outer tube 53 being a tube covering the wire 52 and partially including an accordion part 53a.

Referring to FIGS. 2 to 5, the derailleur 60 is provided with a derailleur axis 61 fixed to the case 20, a derailleur arm 62 engaged to the derailleur axis 61 to freely slide, a guide pulley 63 as a guide rotation body supported to the derailleur arm 62 to freely rotate, and a return spring 64 as return means for having the derailleur arm 62 return to its original position.

One end part 61a of the derailleur axis 61 is supported to the first case part 21 via a cap 25 by engaging with the retention hole of the cap 25 coupled to the first case part 21 using a bolt (not shown). The other end part 61b is supported to the second case part 22 by engaging with the retention hole of the second case part 22. The one end part 61a formed with an insertion hole 61c into which the wire 52 is inserted is latched with the other end part of a coil spring 66, one end part of which is latched with the cap 25. Such a coil spring 66 prevents the derailleur axis 61 from rotating with respect to the case 20.

To the derailleur axis 61, formed are an accommodation hole 61d for accommodating a cylindrical operation element 54 coupled to the wire 52 using a setscrew 55 in such a manner as to be movable in the direction A5 of the center axis line L5, and a guiding hole 61e being a guiding section for guiding a pin 62p as an operated element for moving the derailleur arm 62 by engaging with the operation element 54. The accommodation hole 61d is a cylindrical hole whose center axis line is the center axis line L5 of the derailleur axis 61. The guiding hole 61e is open towards the accommodation hole 61d, and structured by a pair of long holes opposing to each other in the radial direction of the derailleur axis 61. Each of the long holes is formed in such a helical manner as extending towards the direction A5 of the center axis line and displacing in the peripheral direction. The pin 62p is inserted into the guiding hole 61e to engage with the derailleur axis 61 (see FIGS. 3 and 5), and the shifting movement range being a moving range for the derailleur arm 62 to shift the operation sprocket among the sprocket group 40 is defined by a first stopper 61f structured by the rim part of one end part of the guiding hole 61e, a second stopper 61g structured by the rim of the other end part of the guiding hole 61e, and a coil spring 66.

The derailleur arm 62 is provided with a cylindrical boss 62c engaging with the outer radius of the derailleur axis 61 to freely slide, a pair of first and second arm parts 62a and 62b whose base end parts are compressed into the outer radius of the boss 62c for fixation thereto, a rivet 62e provided at the tip parts of the arm parts 62a and 62b, and inserted into the inside of a collar 62d defining a gap between the arm parts 62a and 62b for coupling the arm parts 62a and 62b as coupling member having the collar therebetween, and a support axis 62f engaged to the outer radius of the rivet 62e to support the guide pulley 63 to freely rotate between the first and second arm parts 62a and 62b.

The pin 62p inserted into the guiding hole 61e is fixed to the derailleur arm 62 so that the derailleur arm 62 moves, in the shifting movement range, on the derailleur axis 61 in the direction A5 of the center axis line and the peripheral direction of the derailleur axis 61 responding to the operation of the gear-change operation member 51. As a result, both end parts of the pin 62p going through a pair of trough holes 62c1 of the boss 62c are compressed into another pair of through holes 62b1 formed to the base end part of the second arm part 62b for fixation. At the tip part of the second arm part 62b, formed is a spring accommodation section 62b2 for accommodating a tension spring 73 of the tensioner 70, which will be described later. The tension spring 73 is arranged in the accommodation section 62b2 so as to enclose the rivet 62e.

Referring to FIG. 2, the return spring 64 being a compression coil spring is placed in the case 20 in such a manner that one end part thereof abuts to a spring receiving section of the cap 25, and the other end part thereof abuts to a spring receiving section of the first arm part 62a. When the derailleur arm 62 occupies the original position being the fastest gear position at which the chain 48 is wound around the gear-change sprocket 47, the return spring 64 so biases the derailleur arm 62 that the pin 62p is positioning at one end part of the guiding hole 61e to abut to the first stopper 61f (see FIG. 4).

In such a manner, responding to the operation of the gear-change operation member 51, when the operation element 54 coupled to the wire 52 moves in the accommodation hole 61d in the direction A5 of the center axis line, in the shifting movement range, the derailleur arm 62 translationally moves on the derailleur axis 61 in the direction A5 of the center axis line and swings about the derailleur axis 61. This is due to the operation force generated by the engagement with the operation element 54 moving against the spring force of the return spring 64, and the spring force of the return spring 64 actuating via the derailleur arm 62.

Then, depending on the gear position of the derailleur arm 62, the chain 48 guided by the guide pulley 63 moving together with the derailleur arm 62 occupying the gear position determined by the operation amount of the gear-change operation member 51 is wound around the operation sprocket alternatively selected from the sprocket group 40, and thus the driving sprocket 31 and the operation sprocket are drive-coupled together by the chain 48.

At this time, the shape of the guiding hole 61e is so set that the derailleur arm 62 and the guide pulley 63 occupy, depending on the gear-change sprockets 41 to 47 varying in outer diameter according to the gear position, the positions as close as possible to the operation sprocket, and the positions as close as possible to the output axis 24. Thus, as shown in FIG. 3, the tip part of the derailleur arm 62 and the guide pulley 63 occupy the lowest position closest to the output axis 24 in the radial direction among the seventh gear positions at which chain 48 is wound around the gear-change sprocket 47 whose outer diameter is the smallest among the gear-change sprockets 41 to 47 varying in outer diameter, i.e., addendum circle diameter. As the derailleur arm 62 moves closer to the gear position on the slower side, they move away from the output axis 24 by degrees, and occupy the highest position being the farthest position from the output axis 24 in the radial direction at the first gear position at which the chain 48 is wound around the gear-change sprocket 41 whose outer diameter is the largest among the sprocket group 40.

Figure 4:
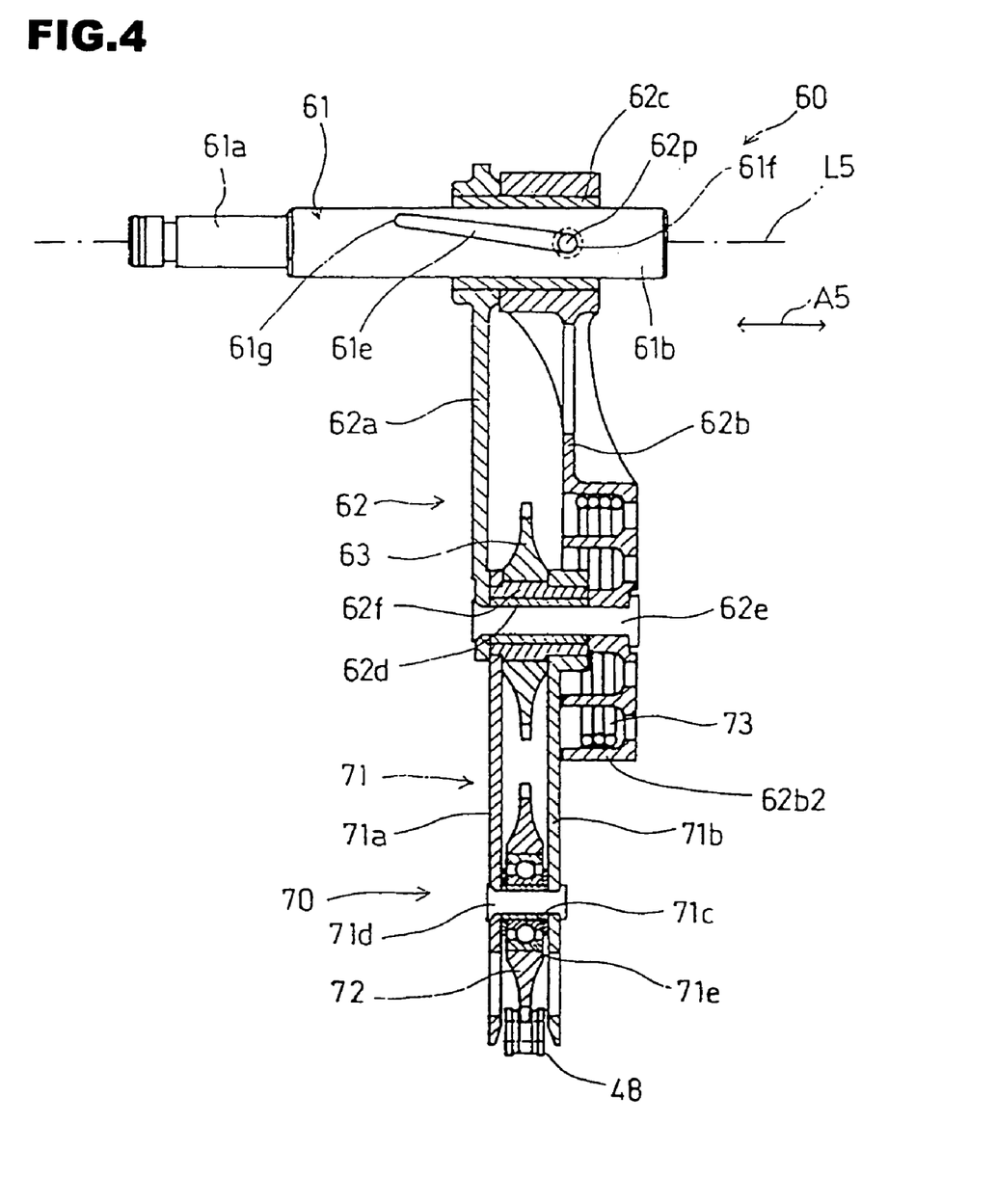
FIG. 4 is a section view of a derailleur and a tensioner taken along line IV—IV of FIG. 3.

Referring to FIGS. 3 and 4, the tensioner 70 is provided with a holder 71 rotatably supported to the support axis 62f of the derailleur arm 62 between the first and second arm parts 62a and 62b, a tension pulley 72 as a tension rotation body rotatably supported to the holder 71, and a tension spring 73. The holder 71 is provided with a pair of first and second arms 71a and 71b whose base end parts are engaged to the outer radius of the support axis 62f to freely swing, a collar 71c provided at the tip parts of the arms 71a and 71b to define a gap between the arms 71a and 71b, and provided to serve as a support axis of the tension pulley 72, a rivet 71d inserted into the inside of the collar 71c to couple the arms 71a and 71b as a coupling member with the collar 71c therebetween, and a bearing 71e compressed into the outer radius of the collar 71c.

The tension pulley 72 is rotatably supported to the collar 71c between the first and second arms 71a and 71b via the bearing 71e. Using the first and second arms 71a and 71b as a chain guide, the chain 48 is wound around the guide pulley 63 and the tension pulley 72.

As shown in FIG. 3, one end part 73a of the tension spring 73 being a return coil spring is latched with the second arm part 62b, and the other end part 73b is latched with the second arm 71b of the tensioner 70. Due to the spring force, the holder 71, and the tension pulley 72 are biased to provide the chain 48 with almost constant tension.

Referring to FIG. 3, when viewed from the side, the pivot axis 7 fixed to the rear parts 2a of the pair of main frames 2 is located inside of the chain 48, and passing through a space formed inside of the chain to protrude from the case 20 in the lateral direction (see also FIG. 2). The pivot axis 7 is then placed as close as possible to the output axis 24 in the rear of the output axis 24 provided with the sprocket group 40. This placement is for suppressing any distance change as much as possible, when the swing arms 8 swing, between the rotation center line L4 of the output axis 24 and the rotation center line L6 of the rear wheel $W_R$ (see FIG. 1). Further, the guide pulley 63 and the tension pulley 72 supported by the derailleur arm 62 freely swing about the derailleur axis 61 placed directly above the output axis 24 are placed in the case 20 utilizing the space formed in the rear of the output axis 24.

As shown in FIGS. 2 and 3, when the gear-change sprocket 47 is selected as the operation sprocket out of the sprocket group 40 by the derailleur 60 including the derailleur arm 62 at the original position, the crankshaft 11 rotating in the forward direction A0 responding to the driver's depressing the pedals rotate-drives the driving sprocket 31 via the one-direction clutch 32. The driving sprocket 31 rotate-drives the gear-change sprocket 47, the output axis 24, and the driving sprocket 15 at the gear-change rate determined by these sprockets 31 and 47 via the chain 48. The driving sprocket 15 rotate-drives the driven sprocket 17 (see FIG. 1) and the rear wheel $W_R$ via the chain 16. In such a structure, the driving force of the crankshaft 11 to be rotate-driven by the driver is transmitted to the output axis 24 via the driving sprocket 31, the chain 48, and the gear-change sprocket 47. The power force of the output axis 24 is then transmitted to the rear wheel $W_R$ via the driving force transmission mechanism, thereby rendering the bicycle B run at seventh gear position.

Figure 5:
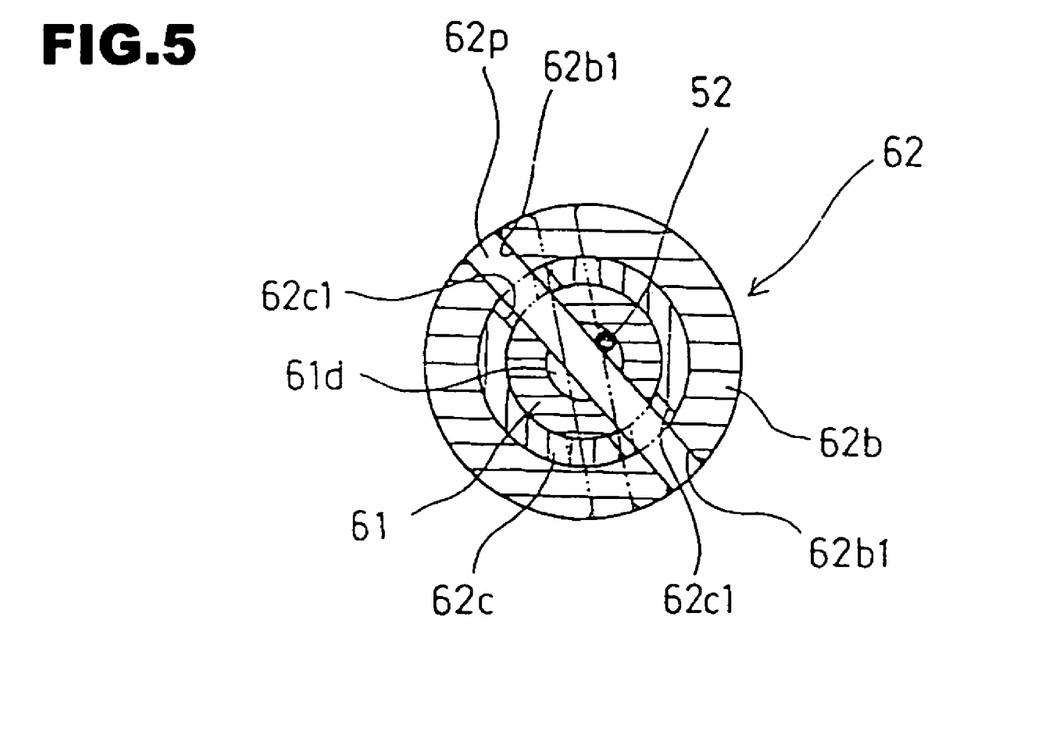
FIG. 5 is a section view taken along line V—V line of FIG. 2.

In order to shift the gear position from the original position by the derailleur 60, when the gear-change operation member 51 is so operated as to select, as the operation sprocket, the gear-change sprockets 41 to 46 locating at the lower speed side, e.g., the gear-change sprocket 41, the operation element 54 moving leftward in FIG. 2 in the direction A5 of the center axis line by the wire 52 pushes the pin 62p. This moves the pin 62p from the first stopper 61f to the position abutting to the second stopper 61g. At this time, the derailleur arm 62 and the guide pulley 63 moving together with the pin 62p move on the derailleur axis 61 leftward in FIG. 2 in the direction A5 of the center axis line, and swing in the clock direction in FIG. 3 about the derailleur axis 61. At the time point when the pin 62p abuts to the second stopper 61g, occupied is the first gear position being the gear position indicated by the two-dotted lines in FIGS. 2 and 3. FIG. 5 shows the state in which the pin 61p is in at this time by the two-dotted lines.

When the derailleur arm 62 moves, the chain 48 moving leftward in FIG. 2 together with the guide pulley 63 simultaneously moves the driving sprocket 31 movable in the above movement range by the sliding mechanism leftward in the direction A3 of the rotation center line with respect to the main axis 11a of the crankshaft 11 together with the outer tube 35. At the time when the pin 62p abuts to the second stopper 61g, the driving sprocket 31 occupies the position indicated by the two-dotted lines of FIG. 2. At this time, the chain 48 is wound around the gear-change sprocket 41 for drive-coupling with the driving sprocket 31 via the chain 48.

The tension pulley 72 occupies the position providing almost constant tension to the chain 48 by the tension spring 73.

When the gear-change operation member 51 is so operated that the operation sprocket is selected from the gear-change sprockets 42 to 47 on the faster side than the gear-change sprocket 41, and when the wire 52 is loosened, the return spring 64 moves the derailleur arm 62 towards the original position. Then, the guide pulley 63 selects the gear-change sprockets 42 to 47 on the lower speed side as the operation sprocket, and the chain 48 is wound around the operation sprocket. At this time, simultaneously when the derailleur arm 62 moves, the chain 48 moves the driving sprocket 31 in the direction A3 of the rotation center line to the position corresponding to the new gear position. Then, the bicycle B runs at the gear-change rate at the new gear position.

Similarly, when changing the gear position, the derailleur arm 62, the guide pulley 63, and the tension pulley 72 move towards any desired gear position responding to the operation of the gear-change operation member 51. Simultaneously therewith, the driving sprocket 31 also moves on the main axis 11a following the movement of the derailleur arm 62. Then, by the derailleur 60, selected is one operation sprocket corresponding to any desired gear position from the sprocket group 40. The driving sprocket 31 and the operation sprocket are then drive-coupled via the chain 48.

As such, following the movement of the derailleur arm 62 to shift the gear position, by the driving sprocket 31 moving in the same direction as the translational movement of the derailleur arm 62 in the above shifting movement range, gear change can be swiftly done to the selected gear-change sprockets 41 to 47 with rapidity and reliability even if the gap between the driving sprocket 31 and the sprocket group 40 is narrowed down. Thus, the transmission T can be reduced in size, and in the resulting small transmission T, gear change can be swiftly done to any desired gear position with reliability.

When the derailleur arm 62 moves in the above shifting movement range, the derailleur arm 62, the guide pulley 63, and the tensioner 70 are always, in the vertical direction, locating below almost the highest part of the derailleur axis 61 positioning directly above the output axis 24 and the sprocket group 40. In the fore-and-aft direction, those are always placed among the tail part of the driving sprocket 31, and the tip parts of the output axis 24 and the derailleur axis 61. With such a positioning, the derailleur arm 62, the guide pulley 63, and the tensioner 70 are so placed as to fit in the range in the fore-and-aft direction and the vertical direction defined by the placement of the driving sprocket 31 coaxial to the main axis 11a of the crankshaft 11, and the sprocket group 40 coaxial to the output axis 24. Therefore, the case 20, and the transmission T can be successfully reduced in size.

The transmission T includes the driving sprocket 31 rotate-driven by the crankshaft 11, and a plurality of gear-change sprockets 41 to 47. Therein, also provided are: the output axis 24 rotatably supported to the case 20 fixed to the bicycle body frame F, and drive-coupled to the gear-change sprockets 41 to 47; and the chain 48 placed across the operation sprocket as a result of alternative selection made from the sprocket group 40 by the derailleur 60 and the driving sprocket 31 for drive-coupling therebetween. The output axis 24 is drive-coupled to the rear wheel $W_R$ via the chain 16, whereby the driving sprocket 31 and the operation sprocket are drive-coupled by the chain 48 for gear change different from the chain 16. Further, the output axis 24 to which the plurality of gear-change sprockets 41 to 47 are drive-coupled are fixed to the bicycle body frame F via the case 20. Such a structure prevents the chain 48 from sagging even if the swing arms 8 swing, leading to swift and reliable shifting to any desired gear position by the derailleur 60, and ensuring gear change with swiftness and reliability. Further, the chain 48 is used to drive-couple the driving sprocket 31 with the operation sprocket drive-coupled to the output axis 24 drive-coupled with the chain 16. This eases placement change of the output axis 24 in the transmission T to catch up with the position change of the bicycle body frame F and the pivot axis 7, for example. What is better, the placement flexibility is also increased. Moreover, in order to suppress any distance change between the rotation center line L4 of the output axis 24 and the rotation center line L6 of the rear wheel $W_R$ when the swing arms 8 swing, there only needs to place the pivot axis 7 in the vicinity of the output axis 24 having better placement flexibility as described above. This resultantly increases the placement flexibility of the pivot axis 7, leading to better design flexibility of the swing arms 8 and the bicycle body frame F. Moreover, the chain 48 is rather light in weight, making the transmission T light in weight.

The rotation center line L4 of the output axis 24 locates in the virtual movement range defined corresponding to the swing range of the swing arms 8. This can suppress the distance change between the center lines in the swing range of the swing arms 8 to a greater degree.

The transmission T can be reduced in cost by adopting the chain 48 and the gear-change mechanism M1 simple in structure using the sprocket group 40 composed of a plurality of gear-change sprockets conventionally widely used for the bicycle as the gear-change rotation body.

When viewed from the side, the pivot axis 7 is located inside of the chain 48 of the transmission T. This allows the pivot axis 7 to fit in the area enclosed by the transmission T utilizing the space formed inside of the chain 48 when viewed from the side, favorably leading to compact placement of the pivot axis 7 and the transmission T to the bicycle body frame F without increasing the transmission T in size. Further, the pivot axis 7 going through the transmission T in the width direction is placed across the above space. This eliminates the need for separately forming a space for making the pivot axis 7 pass through the transmission T to avoid interference between the pivot axis 7 and the components of the transmission T such as the gear-change mechanism M1. Also in this respect, the transmission T can be prevented from being increased in size.

It will be appreciated that many things can be varied without deviating from the scope and spirit of the invention. For example, the case 20 of the transmission T may be made of synthetic resin. The transmission T may not be provided with the case 20, and if this is the case, the crankshaft 11, the output axis 24, and the derailleur 60 are attached to the bicycle body frame F or supported to the bicycle body frame F via a supporting member such as a bracket formed as a piece with the bicycle body frame F. The swing arm may be singularly provided, either right or left.

As the gear-change pulley, a belt may be used, and as the drive rotation body and the gear-change rotation body, pulleys may be used. Further, as the pulley for output to the rear wheel $W_R$, a circular belt may be used, and as the drive rotation body for output and the driven rotation body for output, pulleys may be used. As to the pivot section, there is no need to be a single member passing through the transmission T in the width direction as the pivot axis 7, and may be multiple members.

We claim:

1. A bicycle comprising:
   a bicycle body frame including a pivot section,
   a swing arm structure,
   a rear wheel,
   a transmission comprising:
      a drive rotation body,
      a crankshaft,
      a plurality of gear-change rotation bodies,
      a gear shifting mechanism,
      an output shaft,
      wherein said output shaft is spaced forward from said crankshaft,
      a gear-change band, and
      an operation rotation body alternatively selected from the plurality of gear-change bodies by the gear shifting mechanism,
   a transmission case attached to the bicycle body frame and enclosing the transmission and an output band,
   wherein the swing arm structure swings about the pivot section, and the swing arm structure supports the rear wheel,
   wherein the drive rotation body is rotatably driven by the crankshaft, and the drive rotation body is drive-coupled to the operation rotation body by the gear-change band,
   wherein the output shaft is rotatable and is drive-coupled to the plurality of gear-change rotation bodies,
   wherein the output shaft is drive-coupled to the rear wheel by the output band,
   wherein said output shaft is spaced forward from said crankshaft,
   wherein at least one rotation body is supported by the transmission case, and
   wherein the pivot section is located within the gear-change band and the output band when viewed from the side.

2. The bicycle of claim 1, wherein the pivot section comprises a single member passing through the transmission.

3. The bicycle of claim 1, wherein the transmission case is a resin.

4. The bicycle of claim 1, wherein the swing arm structure comprises dual arms connecting to the rear wheel.

5. The bicycle of claim 1, wherein the gear-change band is a chain.

6. The bicycle of claim 1, wherein the output band is a chain.

7. The bicycle of claim 1, wherein the gear-change band and the output band are comprised of chains.

8. A bicycle, comprising:
   a body frame having a front main frame and a rear swing arm structure connected at a pivot shaft, said rear swing arm structure supporting a rear wheel,
   a crankshaft supporting a drive rotation body;
   a transmission having an output shaft, wherein said output shaft is spaced forward from said crankshaft, said transmission including the drive rotation body, a plurality of gear-change bodies, a gear shifting mechanism, and a gear change first band coupling together said drive rotation body, one of said plurality of gear-change bodies, and said gear shifting mechanism;
   a transmission case attached to the front main frame and enclosing the transmission; and
   a second band operatively transferring power from said output shaft to the rear wheel, wherein the pivot shaft is located within the gear change first band and the second band when viewed from the side, and wherein said output shaft is spaced forward from said crankshaft.

9. The bicycle of claim 8, wherein said pivot shaft is spaced forward from said crankshaft and rearward from said output shaft, and the output shaft is proximal to the pivot shaft, thereby suppressing any distance change between the output shaft and an axis of the rear wheel when the swing arm structure swings left or right in relation to a front wheel of the bicycle.

10. The bicycle of claim 8, wherein first band defines an aperture.

11. The bicycle of claim 10, wherein the swing arm structure is connected to the bicycle body frame at a pivot shaft, wherein the pivot shaft passes through the aperture defined by the gear change first band.

12. The bicycle of claim 10, further comprising a transmission case, wherein the transmission case is attached to the bicycle body frame and encloses the transmission.

13. The bicycle of claim 8, wherein the transmission case is a resin.

14. The bicycle of claim 8, wherein a rear end of the swing arm structure comprises dual arms connecting to the rear wheel.

15. The bicycle of claim 8, wherein the gear-change first band is a chain.

* * * * *